United States Patent [19]

Sherry et al.

[11] Patent Number: 5,579,986
[45] Date of Patent: Dec. 3, 1996

[54] DUAL-FUNCTION FASTENER AND METHOD OF USE

[75] Inventors: Neil J. Sherry, Knebworth; Keith Denham, Welwyn Garden City, both of England

[73] Assignee: Avdel Systems Limited, Welwyn Garden City, England

[21] Appl. No.: 330,991

[22] Filed: Oct. 28, 1994

[30] Foreign Application Priority Data

Oct. 29, 1993 [GB] United Kingdom ............... 9322396

[51] Int. Cl.⁶ .................... B23K 9/00; B23K 11/04; F16B 37/06
[52] U.S. Cl. .................. 228/175; 219/99; 29/525.05; 29/525.14; 411/171
[58] Field of Search .................. 411/43, 171, 361; 29/401.1, 525.1, 525.05, 525.14; 219/96, 98, 99, 100, 107; 228/175

[56] References Cited

U.S. PATENT DOCUMENTS

| | | | |
|---|---|---|---|
| 3,671,710 | 6/1972 | Coombs | 219/99 |
| 4,261,245 | 4/1981 | Mauer | 219/98 X |
| 4,359,813 | 11/1982 | Mauer | 219/98 X |
| 4,850,771 | 7/1989 | Hurd | 411/43 |
| 5,414,234 | 5/1995 | Kito | 219/99 |

*Primary Examiner*—Neill R. Wilson
*Attorney, Agent, or Firm*—Oblon, Spivak, McClelland, Maier & Neustadt, P.C.

[57] ABSTRACT

A pin-type fastener capable of dual-function includes a pin which can be used in fastening workpieces together. The pin has a pintail capable of being removed from the remainder of the pin after the pin has been installed as a fastener in a workpiece, and the pintail can then be used as a weldstud and welded to the same workpiece as the pin-type fastener, or to another workpiece. The pin-type fastener can be a two-part fastener, for example a lockbolt including a nut or swageable collar engageable with the pin. The pin may have a breakneck to facilitate removal of the pintail. The pin itself may be a weldstud. In use, the pin-type fastener is installed in a workpiece and the pintail is removed, and then the pintail is used as a weldstud, being welded to a workpiece. Electric welding is employed. The advantage of the fastener is in economy through second use of the pintail as a stud.

6 Claims, 2 Drawing Sheets

DUAL-FUNCTION FASTENER AND METHOD OF USE

BACKGROUND OF THE INVENTION

1. Field of the Invention

A dual function fastener and method of use is disclosed.

2. Discussion of the Background

Pin-type fasteners with removable pintails are, in general, well known. In use of the fastener, the pintail is gripped by a first part (e.g. in the form of a set of jaws) of an installation tool, a second part (e.g. in the form of an annular anvil) of the tool engages a second part of the fastener (e.g. in the form of a collar or shell), and the tool is activated (e.g. by hydraulic power) to retract the first part of the tool relative to the second part of the tool, thereby to cause the second part of the tool to deform one or both parts of the fastener.

The effect of such deformation may be to clamp two or more workpieces together, and/or to secure one or the other or both parts of the fastener to a workpiece, and/or to lock the two parts of the fastener to each other, depending upon the design of the fastener.

After such locking engagement has been achieved, it is usually necessary to remove the pintail because it protrudes beyond the second part of the installed fastener. However, such removal can be made to serve the useful function of ensuring that sufficient force has been applied to the fastener by the tool to achieve satisfactory deformation. This is arranged by taking the reaction to the deforming load as tension load on the pintail, and by designing and manufacturing the pin so that it fractures at a tension load of a predetermined value, or of not less than a minimum predetermined value.

The pin is alternatively known as a stem, and such fasteners are also known as breakstem fasteners.

Various examples of such fasteners are described in patent specifications GB 424241, GB 629098 (commercially available under the trademark AVDELOK), GB 1 029 654 (commercially available under the trademark AVEX), GB 1538872 (commercially available under the trademark MONOBOLT), and GB 2227538 (commercially available under the trademark MAXLOK).

As explained in GB 424241 at page 3 lines 119 to 128, the locking grooves on the pin could be of spiral (or rather helical) form so as to provide a screwthread, so that the two parts of the installed fastener can later be unscrewed apart.

There are many different varieties of pin-type fasteners with removable pintails, of which the abovementioned references illustrate some of the more important ones.

Patent specifications GB 1528730 and GB 1593508 disclose the attachment of various varieties of pin-type fasteners to a workpiece by means of so-called flash-butt welding or stud welding, so that the fastener does not protrude through the first workpiece, and a second workpiece may be then secured to the first workpiece by means of the pin-type fastener.

It is also known to electrically weld a simple stud to a metal workpiece, i.e. the so-called stud welding process. This is described in GB 1528730 at page 1 lines 8 to 16.

In all cases, when the pin-type fastener is installed, the pintail is broken off and is of no further use. At best, broken off pintails are collected and used as scrap metal i.e. to be melted down to provide metal for reprocessing.

SUMMARY OF THE INVENTION

The present invention is intended to provide a dual function fastener in which the broken-off pintail can be re-used as a further fastener.

The invention provides, in one of its aspects, a method of using a dual-function fastener of the pin-type including a removable pintail, comprising first installing the fastener and removing the pintail, and then using the pintail as a weldstud.

The invention provides, in another of its aspects, a method of using a dual-function fastener of the pin-type including a removable pintail, comprising the steps of:

firstly welding the end of the pin remote from the pintail to a first workpiece;

secondly deforming a part of the fastener to secure a second workpiece to the first workpiece;

thirdly removing the pintail from the installed fastener;

fourthly using the removed pintail as a weldstud.

The invention provides, in another of its aspects, a dual-function fastener in the form of a pin-type fastener comprising a pin having a pintail, the pintail being a weldstud which is capable of being removed from the remainder of the pin after initial installation of the fastener, and which can thereafter be used as a weldstud.

BRIEF DESCRIPTION OF THE DRAWINGS

A specific embodiment of the invention, and a modification thereof, will now be described by way of example and with reference to the accompanying drawings, in which.

Figure 1:
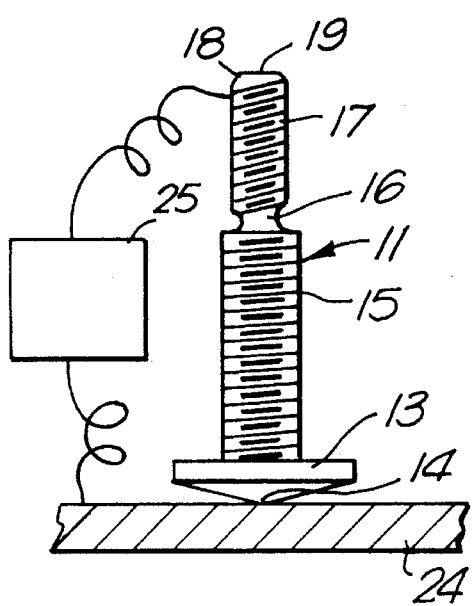
FIGS. 1 to 8 illustrate progressive stages in the use of a dual-function fastener, and FIG. 9 corresponds to FIG. 7 but illustrates a modified form of pintail.
Figure 3:
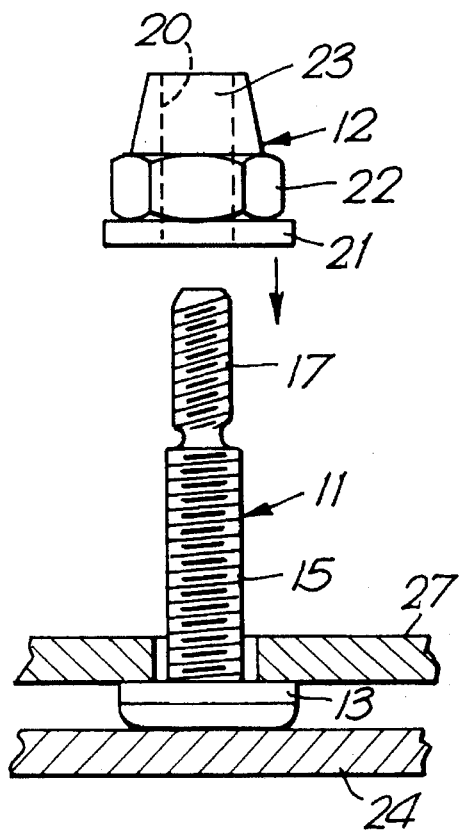

The dual-function fastener of this example is a two-part pin-type fastener, comprising a pin 11 (FIG. 1) and a collar 12 shown with the pin in FIG. 3.

The pin 11 is of zinc-plated steel and comprises an elongated shank or stem with an integral enlarged head 13 at one end. The head 13 is circular in plan and the face remote from the shank is of shallow conical shape to provide a central apex 14, which in use acts as a welding tip. The opposite face of the head is flat.

The main threaded part 15 of the pin shank, adjacent the head 13, is formed with an M6 thread and is of a length convenient for receiving the collar 12, as will be described later.

Adjacent the end of the part 15 of the shank remote from the head 13 is a breakneck 16, which is the weakest part of the shank.

The portion of the shank on the other side of the breakneck 16 is a pintail 17. This is formed with an M5 thread of special configuration, a so-called "fir-tree" thread in which both faces of the thread flanks are inclined in the same direction along the pintail axis. The purpose of this will be described later.

The length of the pintail 17 is sufficient for it to be adequately gripped by the jaws of the installation tool (as will be described later), but may be longer. The free end of the pintail has a bevel 18 and (in this example) a flat end face 19.

The second part of the fastener comprises the collar 12 (FIG. 3) which is of aluminium. Internally it has a central cylindrical bore 20 which is free fit over the main threaded part 15 of the pin shank. The collar is formed externally with a flat-faced flange 21, a hexagonal portion 22, and a tapering portion 23.

In use of the fastener, the first step is to weld the pin 11 to a first workpiece, which will typically consist of a first metal panel 24 of a thickness of 0.7 mm to 3.2 mm. This is done by a conventional stud welding technique, in which the pin 11 is supported perpendicular to the panel 24 (i.e. a second workpiece) with the pin apex 14 in contact with the panel 24. Welding is achieved by passing a suitable welding current, provided by a welding current source illustrated schematically at 25 in FIG. 1, between the pin 11 and panel 24. The result is that the pin 11 is secured to the panel 24 by a weld joint 26 (FIG. 2), so that the shank of the pin projects perpendicular to the panel.

Figure 2:
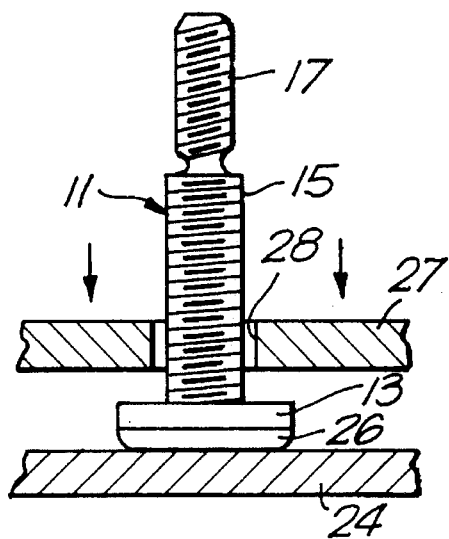

A second workpiece 27, which may be for example another panel, or a bracket or other component, and need not be electrically conductive, is then secured to the panel 24. The workpiece 27 is formed with a suitable aperture 28 to pass over the main portion 15 of the pin shank, as illustrated in FIG. 2.

The workpiece 27 is assembled on the pin 11 so that the workpiece is in contact with the flat face of the pin head 13, and the collar 12 is then also assembled over the pin shank, with the flange 21 towards the workpiece 27 (as illustrated in FIG. 3), until the flange 21 of the collar is in contact with the workpiece 27.

Figure 4:
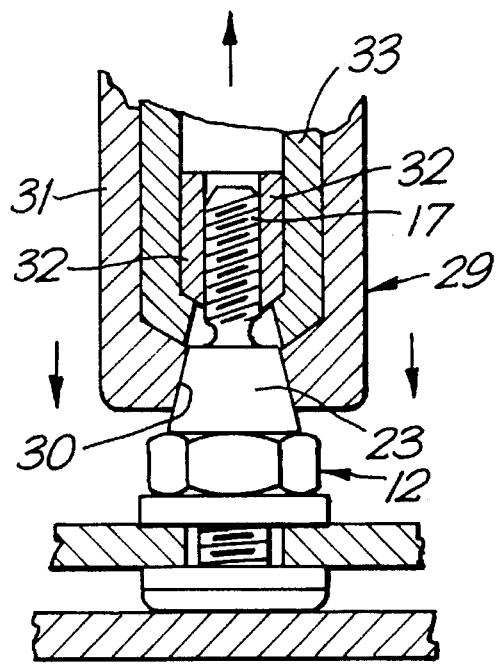

The collar 12 is then deformed into locking engagement with the main portion 15 of the pin shank by means of a swaging tool 29 shown fragmentarily in FIG. 4, and which is similar to that used to instal lockbolts such as are available commercially under the trademark AVDELOK. Such a tool is illustrated in GB 629098 FIGS. 1 & 2, and in GB 1528730 FIG. 6.

Referring to FIG. 4 of the accompanying drawings, the tool 29 comprises an annular anvil 31 having a throat 30 of part-conical shape which receives the tapering portion 23 of the collar 12, and gripping means in the form of a pair of jaws 32 which engage the pintail 17. The jaws are held within a collet 33 which is retractable with respect to the anvil 31 by means of a hydraulic device (not illustrated).

In use, the tool 29 is offered over the pin shank so that the pintail 17 enters into the annular anvil 31 and between the jaws 32. The tapering portion 23 of the collar 12 is larger than the tapering throat 30 of the anvil and will enter only partially into it. The tool is activated so that the hydraulic device retracts the collet 33 with respect to the anvil 31, causing the jaws 32 to engage the pintail 17. A progressively increasing force is therefore applied by the anvil to the tapered portion 23 of the collar, with the reaction to the force being taken up as tension applied to the pintail 17.

The progressively increasing force causes the tapered portion 23 of the collar to deform inwardly, so that the material of the collar adjacent that part of its bore inside the tapered portion is deformed into the adjacent part of the screw thread groove on the portion 15 of the pin shank.

As the tapered portion 23 of the collar reduces in external diameter, the tool 29 advances along the collar. This is the position illustrated in FIG. 4.

Figure 5:
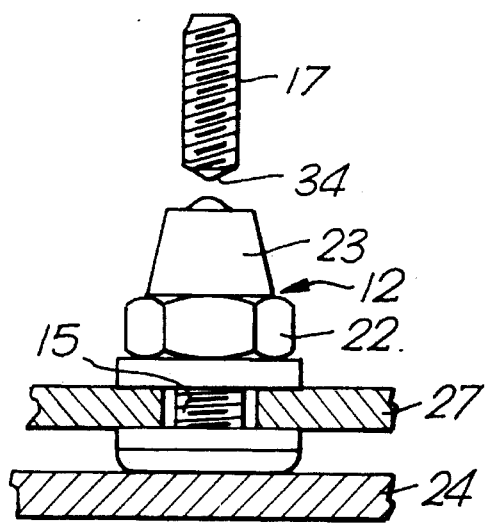

As the tool continues to be actuated, the tension force on the pintail 17 increases until the pin shank fractures at the breakneck 16 and the pintail 17 becomes free of the installed pin, as is illustrated schematically in FIG. 5. The breakneck is such that it fractures at a tension force sufficient to ensure that sufficient deformation force has been applied to the collar that it properly engages with the pin shank grooves. Just before fractures occurs, the material of the breakneck will have stretched, so that the broken off pintail 17 is left with a projecting portion 34, which usually has a sharp-pointed end.

Figure 6:
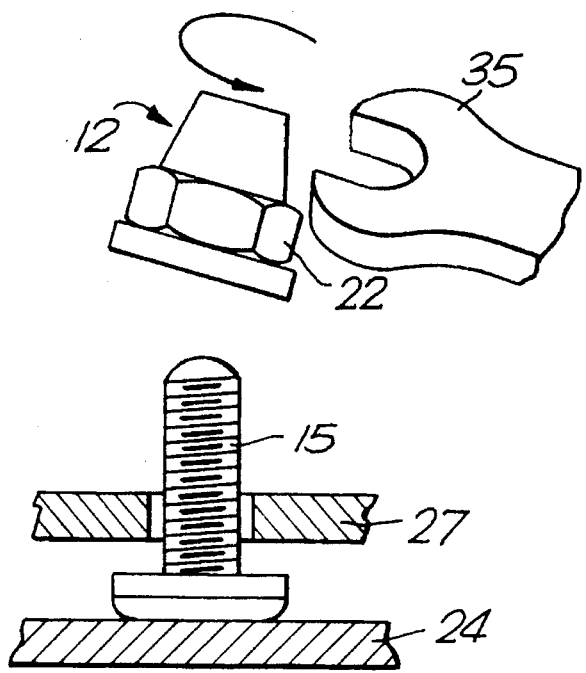

The collar 12 has thus been deformed into the form of a nut in threaded engagement with the threaded portion 15 of the pin 11 which is welded to the panel 24, and thereby secures the workpiece 27 to the panel 24. The collar 12 can be replaceably removed from the threaded pin shank 15 by unscrewing the collar, for instance by applying a spanner 35 to the hexagon portion 22 of the collar as is indicated in FIG. 6.

Figure 7:
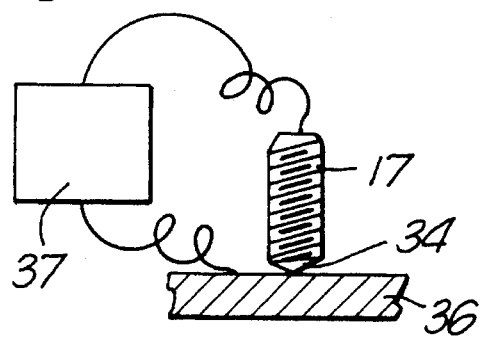
Figure 8:
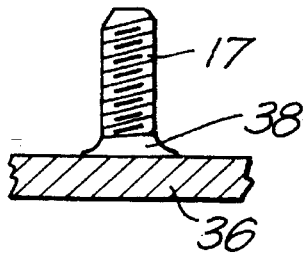

After the pintail 17 has been broken off from the pin shank, it is easily removable from the installation tool 29 (a pintail will usually drop out when the tool is deactuated). According to the method of the present invention, the broken-off pintail is then used as a weldstud. The pintail 17 is held with its projecting portion 34 in contact with a metal panel 36 (which may be the same panel as the panel 24) and a suitable welding current, provided by a welding current source 37 as illustrated schematically in FIG. 7, (which may be the same as the welding current source 25), is passed between the two, as illustrated schematically in FIG. 7. This welds the pintail 17 to the panel 36 by means of a weld joint 38, illustrated in FIG. 8.

It will be recalled that the pintail portion 17 is provided with a screwthread of a symmetrical form. This is arranged so that, when the pintail 17 is welded to the panel 36 by means of the projecting portion which originally formed one side of the breakneck 16, the flanks of the screwthread on the pintail are inclined towards the panel 36. This provides for easy assembly on to it, but more dificult removal, of a suitably apertured resilient member (e.g. of synthetic plastics material), which is to be held thereby to the panel 36.

Figure 9:
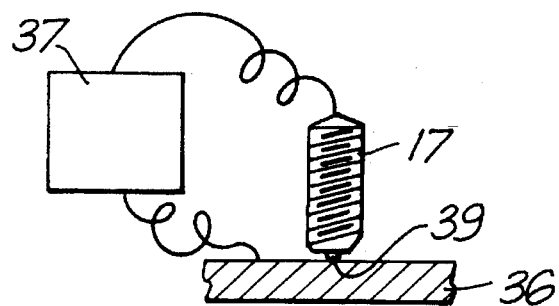

Since the configuration of broken surfaces on pintails resulting from the installation of identical fasteners varies from case to case, it may be found that in practice the broken-off ends of pintails 17 do not provide a consistently reliable welding projection. Accordingly, it may be preferred to provide the free end of the pintail with a pre-formed welding pip 39 (FIG. 9), and to hold that in contact with the panel 36 for welding. If the pintail 17 is provided with an asymmetric screwthread, then the direction in which this is inclined will have to be reversed with respect to that in FIGS. 1 to 8.

The invention is not restricted to the details of the foregoing example. For instance, details of design and manner of installation of the pin-type fastener may be different to those described above, so long as it has a pintail which is broken off and can be used as a weldstud.

We claim:

1. A method of securing a dual-function pin-type fastener having a removable pintail, comprising:

first installing the fastener on a first workpiece, removing the pintail, and securing the pintail as a weldstud to a second workpiece.

2. A method as claimed in claim 1, in which the step of installing the fastener comprises welding the pin to said first workpiece.

3. A method as claimed in claim 2, in which the step of installing the fastener further comprises deforming a part of the fastener to secure a second workpiece to the first workpiece.

4. A method as claimed in claim 1, wherein said second workpiece comprises a portion of said first workpiece.

5. A method of securing a dual-function pin-type fastener having a removable pintail, comprising the steps of:

firstly welding an end of the pin remote from the pintail to a first workpiece;

secondly deforming a part of the fastener to secure a second workpiece to the first workpiece;

thirdly removing the pintail from the installed fastener; and fourthly securing the removed pintail as a weldstud to a second workpiece.

6. A method as claimed in claim 5, wherein said second workpiece comprises a portion of said first workpiece.

* * * * *